(12) United States Patent
Atanasov et al.

(10) Patent No.: US 11,550,830 B2
(45) Date of Patent: Jan. 10, 2023

(54) SYSTEMS AND METHODS FOR MULTI-SOURCE REFERENCE CLASS IDENTIFICATION, BASE RATE CALCULATION, AND PREDICTION

(71) Applicant: Pytho, LLC, Brooklyn, NY (US)

(72) Inventors: Pavel Atanasov, Brooklyn, NY (US); Regina Joseph, New York, NY (US)

(73) Assignee: Pytho, LLC, Brooklyn, NY (US)

( * ) Notice: Subject to any disclaimer, the term of this patent is extended or adjusted under 35 U.S.C. 154(b) by 21 days.

(21) Appl. No.: 16/938,610

(22) Filed: Jul. 24, 2020

(65) Prior Publication Data

US 2021/0034651 A1 Feb. 4, 2021

Related U.S. Application Data

(60) Provisional application No. 62/880,064, filed on Jul. 29, 2019.

(51) Int. Cl.

| | |
|---|---|
| *G06F 16/332* | (2019.01) |
| *G06N 7/00* | (2006.01) |
| *G06F 9/451* | (2018.01) |
| *G06F 16/35* | (2019.01) |
| *G06F 16/335* | (2019.01) |

(52) U.S. Cl.
CPC ......... *G06F 16/3328* (2019.01); *G06F 9/453* (2018.02); *G06F 16/337* (2019.01); *G06F 16/358* (2019.01); *G06N 7/005* (2013.01)

(58) Field of Classification Search
CPC .... G06F 16/3328; G06F 16/358; G06F 9/453; G06F 16/337; G06N 7/005
USPC ...................................................... 707/766
See application file for complete search history.

(56) References Cited

U.S. PATENT DOCUMENTS

| | | | |
|---|---|---|---|
| 8,731,977 B1* | 5/2014 | Hardin | G06Q 40/08 |
| | | | 705/26.1 |
| 9,619,434 B2* | 4/2017 | Pinel | G06N 20/00 |
| 2008/0027770 A1 | 1/2008 | Tigali et al. | |
| 2008/0306903 A1 | 12/2008 | Larson et al. | |
| 2008/0306980 A1 | 12/2008 | Brunner et al. | |
| 2009/0125378 A1* | 5/2009 | Trahan | G06N 7/005 |
| | | | 715/833 |
| 2013/0046725 A1 | 2/2013 | Cammert et al. | |
| 2014/0122410 A1* | 5/2014 | Ludlow | G06F 16/258 |
| | | | 706/59 |
| 2014/0214880 A1 | 7/2014 | Chi et al. | |
| 2016/0171008 A1 | 6/2016 | Ciabrini et al. | |

(Continued)

OTHER PUBLICATIONS

International Search Report and Written Opinion from related International Patent Application No. PCT/US2020/043470 dated Oct. 30, 2020.

*Primary Examiner* — Hosain T Alam
*Assistant Examiner* — Robert F May
(74) *Attorney, Agent, or Firm* — McCarter & English, LLP

(57) ABSTRACT

Systems and methods for multi-source reference class identification, base rate calculation, and prediction are disclosed. The systems and method can guide on, then elicit, information about reference class identification on a case-by-case basis, connects to a database in order to calculate historical base rates according to user reference class selections, and collect additional quantitative and qualitative information from users. The systems and methods can then generate predictive estimates based on the combination of the inputs by one or more users.

23 Claims, 11 Drawing Sheets

(56) References Cited

U.S. PATENT DOCUMENTS

2018/0025303 A1* 1/2018 Janz ................ G16H 50/20
                                                    705/2
2018/0253793 A1* 9/2018 Buckwalter .......... G06Q 40/025

* cited by examiner

| Accuracy Score Summary Components: | Your Score | Benchmark Score | Number of Cases |
|---|---|---|---|
| Reference Class Component | XX | AA | NN |
| Manually Adjusted Estimate Component | YY | BB | NN |
| Overall Score | ZZ | CC | NN |

| Individual Case Score Breakdown | Your Score | Benchmark Score |
|---|---|---|
| Case 1 | .. | .. |
|    Reference Class Component | .. | .. |
|    Manually Adjusted Estimate Component | .. | .. |
| Case 2, etc. | | |

FIG. 10

SYSTEMS AND METHODS FOR MULTI-SOURCE REFERENCE CLASS IDENTIFICATION, BASE RATE CALCULATION, AND PREDICTION

RELATED APPLICATIONS

The present application claims priority to and the benefit of U.S. Provisional Application No. 62/880,064, filed on Jul. 29, 2019, the disclosure of which is incorporated by reference herein in its entirety.

GOVERNMENT RIGHTS

This invention was made with government support under 1919333 (sub-award 13670/132645) and 2030015 (sub-award 31-606-01) awarded by National Science Foundation. The government has certain rights in the invention.

TECHNICAL FIELD

Embodiments of the present disclosure relate generally to systems and method for multi-source reference class identification, base rate calculation, and prediction.

BACKGROUND

Large quantities of data have been made available for retrieval over the Internet or over other communication networks. Such data is generally available from a large number of different data sources, including data sources curated by data service providers. Effectively traversing and searching these data sources can require specialized skills, syntax and knowledge, which can make user interaction difficult and cumbersome. This can be particularly true as it relates to identifying, utilizing, and understanding specific data from which predictive outcome estimates or forecasts are generated.

Currently there are a number of solutions for generating forecasts based on relevant data and expert inputs. Some of these solutions attempt to generate forecasts using statistical modeling or machine learning methods with minimal supervision and expert inputs, but these solutions fail to meet the needs of the industry because they do not account for non-obvious dependencies and structural breaks within the historical data. Other solutions attempt to source forecasts directly from human experts, but these solutions are similarly unable to meet the needs of the industry because experts often rely on individual facts or observations related to a specific new case in question, while ignoring relevant historical information (this is referred to in the scientific literature as "base rate neglect" or "inside-view bias" (Kahneman, D. (2011). *Thinking, fast and slow*. Macmillan, New York, N.Y.). Determining a predictively accurate base rate relies on identifying reference classes, consisting of historical cases. This is known as the reference class problem, which has been studied in probability theory since at least the 19$^{th}$ Century, by statisticians such as John Venn. Methods such as "reference class forecasting" have been deployed to provide estimates for costs and completion times of infrastructure projects based on prior data, but known versions of reference class forecasting methods feature little guidance on how users should identify predictively useful reference classes, and no specific methods for combining reference class and predictive estimates across multiple experts.

Still other solutions seek to utilize expert systems, which may feature networked combinations of computer databases, interfaces and human user inputs. But these solutions also fail to meet industry needs because they are difficult to use by experts unfamiliar with specific computer programming languages and may require specialized software and statistical expertise in order to maintain the system and produce results. Further, they are difficult to modify for specific use cases and can be unsuitable for prediction tasks with relevant historical data and potentially useful inputs from multiple experts. From a software perspective, software tools such as visual query builders allow users to define sub-classes within a database, but these tools are geared toward software developers or individual analysts working on reports; such tools are thus unable to satisfy the need for efficiently aggregated predictions based on inputs from multiple users.

SUMMARY

Embodiments of the present disclosure provide systems and methods that guide and source inputs from multiple users relevant to prediction problems, queries databases using a combination of interfaces and backend processes, utilizes user inputs to generate predictions, and combines these predictions across users. Exemplary embodiments of the present disclosure can overlay and/or mold to a data source as well as the data structures and syntaxes of the data source to provide user interfaces that simplify interactions between users and the data source, while providing accessibility to and discovery of the data in the data source via queries that are automatically generated and submitted on behalf of a user, where the queries can become increasingly specific or increasingly inclusive in response guided input from the user via the user interface.

Embodiments of the systems and methods of the present disclosure incorporate a database of historical cases, and features a cognitive training component and an ergonomic interface allowing human users to improve their predictive efficiency and use their subject matter knowledge to define relevant historical reference classes resulting in database queries (without the requirement that the users have any coding proficiency to formulate a query in a programming language) and subsequent calculation of historical base rates, which can subsequently be used to generate probabilistic or continuous-value predictions about future events and unknown variables.

Embodiments of the systems and methods of the present disclosure allow multiple experts to interact with the system, and combine the multiple expert inputs into one aggregate prediction. On some occasions, specific cases deviate from historical base rates in predictable ways and embodiments of the systems and methods allows users to report predictions that deviate from historical base rates, and explain the reasoning for the said deviations.

Embodiments of the systems and method overcome the deficiencies of conventional systems by providing multi-source reference class identification, base rate calculation, and prediction, which provides probabilistic or continuous predictive estimates for future events and variables.

In accordance with embodiments of the present disclosure, systems, methods, and non-transitory computer-readable media are disclosed. Embodiments of the systems, methods, and non-transitory computer-readable media can include receiving a data structure associated a first database and configuring a components of the system executed by a processing device based on the data structure to associate a question with the database, generate reference class information, and generate one or more graphical user interfaces specific to the question and the reference class information. Embodiments of the systems, methods, and non-transitory computer-readable media can include receiving selection of at least one of reference class criteria or historical reference cases associated with reference class information from a user via a first graphical user interface of the one or more graphical user interfaces, the reference class criteria being generated in response to configuring the system and automatically generating one or more queries based on the reference class criteria or the historical reference cases to define a reference class, wherein narrower queries and increasing specificity of the reference class can occur as additional reference class criterion is selected by the user or broader and increasingly generalization of the reference class can occur as additional historical cases are selected by the user. Embodiments of the systems, methods, and non-transitory computer-readable media can include determining the reference class in response to querying the first database using the one or more queries, identifying a number of cases in the reference class in response to querying the first database using the one or more queries, and calculating a base rate estimate. The base rate estimate can correspond to at least one of (a) a frequency of historical event occurrence, (b) time-specific probabilistic estimates derived from survival analysis, or (c) descriptive statistics for a continuous variable associated with the reference class. Embodiments of the systems, methods, and non-transitory computer-readable media can include displaying the base rate estimate associated with the reference class or an overall base rate across all selected different reference classes.

In accordance with embodiments of the present disclosure, a method is disclosed that includes determining a reference class to which a new case in question belongs in response to receiving inputs associated with reference class information from a user via a first graphical user interface. The inputs can include at least one of reference class selection criteria producing a smaller and more specific reference class as each additional reference class criterion is added, or selecting historical reference cases producing a larger and more general reference class as additional historical cases are added. The method can also include querying a first database in response to determining the reference class to update a number of cases in the reference class; calculating a base rate estimate, the base rate estimate corresponding to at least one of (a) a frequency of historical event occurrence, (b) time-specific probabilistic estimates derived from survival analysis, or (c) descriptive statistics for a continuous variable associated with the reference class; displaying the base rate estimate associated with the reference class or an overall base rate across all selected different reference classes; and storing a reference class definition, the base rate estimate and a final predictive estimate for the user in a second database residing on one or more servers.

In accordance with embodiments of the present disclosure, a non-transitory computer-readable medium storing instructions is disclosed and a system that includes the non-transitory computer-readable medium and a processing device is disclosed. The processing device can be programmed to execute the instructions to: determine a reference class to which a new case in question belongs in response to receiving inputs associated with reference class information from a user via a first graphical user interface. The inputs can include at least one of reference class selection criteria producing a smaller and more specific reference class as each additional reference class criterion is added, or selecting historical reference cases producing a larger and more general reference class as additional historical cases are added. The processing device can also be programmed to execute the instructions to query a first database in response to determining the reference class to update a number of cases in the reference class; calculate a base rate estimate, the base rate estimate corresponding to at least one of (a) a frequency of historical event occurrence, (b) time-specific probabilistic estimates derived from survival analysis, or (c) descriptive statistics for a continuous variable associated with the reference class; display the base rate estimate associated with the reference class or an overall base rate across a plurality of selected different reference classes; and store a reference class definition, the base rate estimate and a final predictive estimate for the user in a second database residing on one or more servers.

In accordance with embodiments of the present disclosure, the reference class can be determined in response to receiving, via the first graphical user interface, predictive variables and values for the predictive variables from the one or more users characterizing the reference class or in response to selection by the one or more users of historical reference cases via the first graphical user interface.

In accordance with embodiments of the present disclosure, a manual adjustment to the base rate estimate can be received, at least one of an adjusted probabilistic estimate or an adjusted quantitative predictive estimate can be determined based on the manual adjustments, and the manual adjustment and the adjusted probabilistic or other quantitative predictive estimate for the user can be stored in the second database residing on the one or more servers.

In accordance with embodiments of the present disclosure, the base rate and final probabilistic or other quantitative predictive estimate associated with the user can be aggregated with results from other users into at least one of an aggregated probabilistic estimate or an aggregated quantitative estimate for the question.

In accordance with the embodiments of the present disclosure, the aggregated probabilistic estimate or other quantitative predictive estimate can be updated each time new information is received from the user or the other users.

In accordance with embodiments of the present disclosure, the probabilistic estimates, or other quantitative predictive estimates, can be aggregated using a weighted mean or weighted median approach, where a weight value is determined based on the past accuracy of the user or the other users, properties of defined reference classes, or other characteristics of the user or the other users.

In accordance with embodiments of the present disclosure, the aggregated probabilistic, or other quantitative predictive estimate, estimate can be determined using regression-based or machine learning algorithms.

In accordance with embodiments of the present disclosure, a visualization with information about historical reference cases included in the reference class selected by the user can be displayed.

In accordance with embodiments of the present disclosure, the user can be trained before the user provides the predictive estimates, wherein the training can include a brief overview of a prediction process, a brief introduction to a subject matter area associated with a new question and the first and second databases, or a predictive training section to aid the user in avoiding cognitive biases and improving forecasting accuracy.

In accordance with embodiments of the present disclosure, a score for the user can be generated based on a performance of the user in providing the probabilistic estimates or other quantitative predictive estimates, where the score can be determined based on the reference class selections and manual adjustments received from the user.

In accordance with embodiments of the present disclosure, a series of psychometric tests can be administered to measure cognitive abilities and propensities of the user.

In accordance with embodiments of the present disclosure, at least one of accuracy scores or aggregation schemas can be updated as a result of new information about predictive questions, new data on individual user behavior or accuracy, or other new information available in the system.

In accordance with embodiments of the present disclosure, a report can be generated based on information provided by the user and the other users, the report including reference class assessments, final predictive estimates and textual information provided by the user and the other users.

In accordance with embodiments of the present disclosure, a report for the case can be generated, where the report can include aggregated probabilistic or other quantitative predictive estimates and combined rationales from the user and the other users.

In accordance with embodiments of the present disclosure, a preliminary probabilistic or other quantitative predictive estimate can be received from the user before proceeding to determining the reference class.

In accordance with embodiments of the present disclosure, a database can be updated with historical reference cases by an administrator through uploading a data table via a graphical user interface, without writing or editing computer code.

Among other things, it is an objective of the present disclosure to provide a system, method and software process for multi-source reference class identification, base rate calculation, and prediction that solves the problems or deficiencies associated with prior solutions.

It is an objective of the present disclosure to produce data-supported predictive estimates based on inputs from one or more users about reference class selection and subjective probabilistic or continuous-variable predictive estimates.

It is further an objective of the present disclosure to apply a user interface that allows users to interact with the system and provide input without the need to possess subject matter expertise, or coding, statistical, data science, or forecasting skills.

It is further an objective of the present disclosure to incorporate and display visualizations of data sources ingested by the system, thus enabling users to view data about historical cases in order to inform their predictions.

It is further an objective of the present disclosure to provide a cost-effective method for generating predictions, with potential savings stemming from reduced work burden by analysts, data scientists and research staff.

It is further an objective of the present disclosure to collect and summarize a range of perspectives, knowledge and viewpoints in a timely manner, making the system more robust by limiting the potential negative impact of errors from individual users or statistical forecasting processes.

It is further an objective of the present disclosure to provide cognitive training to human users in generating useful reference class assessments and predictions as well as in correctly utilizing the system.

It is further an objective of the present disclosure to reduce cognitive bias among human users by withholding information about base rates during the reference class identification stage of the process.

It is further an objective of the present disclosure to produce statistical combinations of these predictive estimates automatically, therefore eliminating the need to involve software developers or data scientists for generating estimates for each question.

It is further an objective of the present disclosure to provide a weighting and combination schema that places higher weights on users via inputs including but not limited to past performance scores, psychometric tests and other behavioral data captured by the software platform that indicate a user's greater knowledge or skill in reference class identification and prediction.

It is further an objective of the present disclosure to provide a way for system administrators with little or no software coding abilities to provide updates or changes to the database containing the data used to define reference classes, calculate and display base rates to forecaster users.

Embodiments of the present disclosure are described more fully hereinafter with reference to the accompanying drawings, which are intended to be read in conjunction with both this summary, and the detailed description. The drawings should not be construed as limited to the embodiments set forth herein; rather, these embodiments are provided by way of illustration only and so that this disclosure will be thorough, complete and will fully convey the full scope to those skilled in the art.

BRIEF DESCRIPTION OF THE DRAWINGS

FIG. 10 depicts an exemplary scoring feedback summary in accordance with embodiments of the present disclosure.

DETAILED DESCRIPTION

Embodiments of the present disclosure are directed to systems and methods for multi-source reference class identification, base rate calculation, and prediction. Embodiments of the systems and methods can guide and source inputs from multiple users that are relevant to prediction problems, automatically generate and submit queries to databases using a combination of interfaces and backend processes, utilize user inputs to generate predictions, and combine predictions across users. Embodiments of the systems and methods of the present disclosure can improve predictive efficiency and leverage users' subject matter knowledge to define relevant historical reference classes that can be translated into database queries (without the requirement that the users have any coding proficiency to formulate a query in a programming language) and/or to generate calculations of historical base rates, which can subsequently be used to generate probabilistic or continuous-value predictions about future events and unknown variables. Exemplary embodiments of the systems and methods of the present disclosure can receive inputs from human experts and can use the inputs to build classification trees, which can be combined into forests.

Embodiments of the present disclosure address the challenge posed by the variety and volume of external databases containing both specialist and general information. Predictive analysis requires extracting and analyzing frequencies of prior event occurrence or past values of variables from data sources (e.g., historical data) to derive a base rate. The present embodiment describes a method of categorizing information such as that found in external databases into comparators, or reference classes. The elicitation platform as described herein can subsequently calculate a base rate from the one or more reference classes a user has formed by querying information in the database(s). The base rate derived from the reference classes formed by the user then provides a foundation from which the user can generate forecasts. Thus embodiments of the present disclosure serve as a "scaffold" that essentially "wraps" around the "edifices" of information databases. The scaffold allows human forecasters to explore and scale up and down the edifice of information by allowing them to shape how the contours of the scaffolding fit around the edifice of data.

Figure 1:
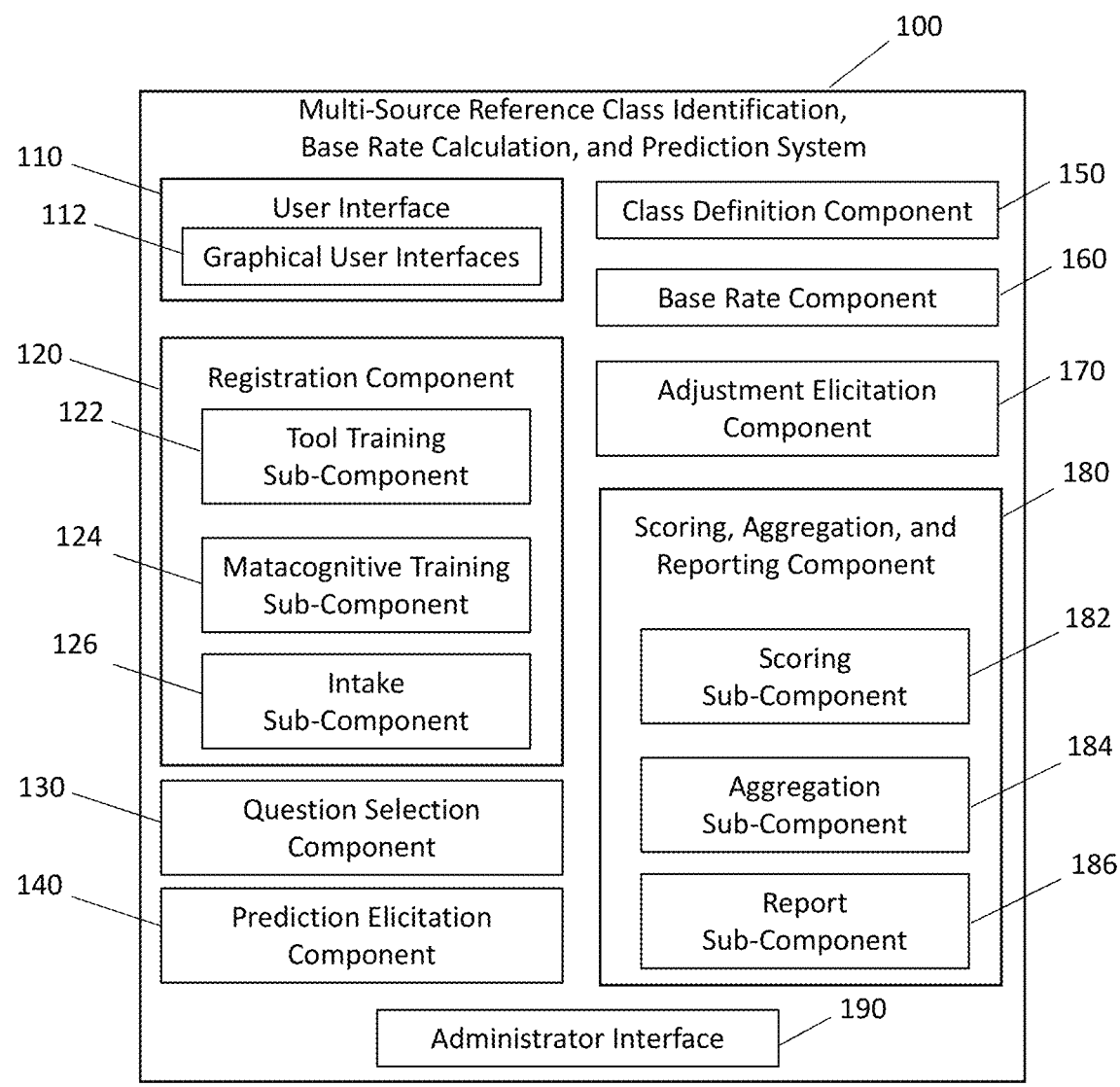
FIG. 1 is a block diagram of a multi-source reference class identification, base rate calculation, and prediction system in accordance with embodiments of the present disclosure.

FIG. 1 is a block diagram of a multi-source reference class identification, base rate calculation, and prediction system 100 in accordance with embodiments of the present disclosure. Embodiments of the system 100 can overlay and/or mold to data in databases from which reference classes are to be derived as well as to the data structures and syntaxes of the databases to provide user interfaces that simplify interactions between users and the databases from which reference classes are to be derived, while providing accessibility to and discovery of the data in the databases from which reference classes are to be derived via queries that are automatically generated and submitted on behalf of a user, where the queries can become increasingly specific or increasing general in response guided input from the user via the user interface.

The system 100 can provide workflow processes and computing resources to guide and source inputs from multiple users relevant to prediction problems, queries databases using a combination of interfaces and backend processes, utilizes user inputs to generate predictions, and combines these predictions across users. The system 100 can include a user interface component 110, a registration component 120, a question selection component 130, a prediction elicitation component 140, a reference class definition component 150, a base rate component 160, an adjustment elicitation component 170, a scoring, aggregation, and reporting component 180, and an administrator interface component 190 used to update the database containing cases for base rate calculation.

The user interface component 110 can be programmed and/or configured to provide one or more graphical user interfaces (GUIs) 112 through which users of the system 100 can interact with the system 100. In exemplary embodiments, the user interface 110 can provide an interface between the users and the components 120, 130, 140, 150, 160, 170, and 180. As shown in FIG. 1, the administrator interface 190 can be separate from the user interface component 110. In some embodiments, the administrator interface can be integrated or combined with the user interface component 110. The GUIs 112 can be rendered on display devices and can include data output areas to display information to the users as well as data entry areas to receive information from the users. For example, data output areas of the GUIs 112 can output information associated with questions, reference class definitions, visualizations, predictive/probabilistic estimates, scores, analysis, and any other suitable information to the users via the data outputs and the data entry areas of the GUIs 112 can receive, for example, information associated with user information, reference class selections, predictive/probabilistic estimates, manual adjustments, rationales, and any other suitable information from users. Some examples of data output areas can include, but are not limited to text, visualizations of ingested data and graphics (e.g., graphs, maps (geographic or otherwise), images, and the like), and/or any other suitable data output areas. Some examples of data entry fields can include, but are not limited to text boxes, check boxes, buttons, dropdown menus, and/or any other suitable data entry fields.

The registration component 120 allows a user to establish an account with the system 100 and can maintain information about users that can be used to facilitate class definitions as well as base rate calculations and report generation. The registration component 120 supports user registration and management processes including registering new users and capturing and storing user profile information. The registration component 120 can be programmed to render one or more of the GUIs 112 through which the system 100 can receive usernames, passwords, contact information, and/or areas of subject matter expertise from users that are new to the system 100. The registration component 120 can include a tool training subcomponent 122, a metacognitive training subcomponent 124, and an intake subcomponent 126.

The tool training subcomponent 122 can be executed after a user completes the registration process and can train users on how to use the system 100. The tool training component 122 can provide demonstrations of example reference class definitions and forecast submissions, which can be illustrated via media including, but not limited to, still images, animations, videos, audio, etc. This demonstrative media can inform users how to perform tasks using the system 100 and its associated databases (using examples that may be generic or specific to a given subject matter area), as well as how their performance can be scored. The tool training subcomponent can, but does not necessarily, include detailed advice on achieving optimal performance.

The metacognitive training subcomponent 124 can be responsible for supporting the cognitive testing processes to provide a predictive training section to train users on avoiding cognitive biases and improving forecasting accuracy. The metacognitive training subcomponent 124 can be modular, and can be executed during different phases of the system workflow dependent on a user's prior exposure to the system. The metacognitive training subcomponent 124 can focus on probabilistic reasoning and forecasting techniques. The metacognitive training subcomponent can provide modules to help users with reference class selection, and probabilistic reasoning, and can instruct users on how to develop good forecasting technique. The metacognitive training provided by the metacognitive subcomponent 124 can involve acquainting a forecasting cohort with forecasting practices or techniques, such as inside vs. outside view approaches, how to effectively hunt for open source information on a topic; how to break down complex problems, average and weight external estimates; and/or how to update one's beliefs based on new information. These concepts can be dense, and can require effort to understand and apply. By using engaging and artful narratives to convey the principles of good forecasting technique, while easing the cognitive burden of absorbing such lessons, the metacognitive training subcomponent 124 can yield higher effectiveness in improving prediction accuracy. Acquainting users with types of reference classes that tend to be most (and least) helpful for predicting outcomes, and how base rate information can be incorporated in efficient forecasting practice are integral to the modular training aspect of the system 100. The metacognitive training may be particularly important to non-expert users, who may have more difficulty locating relevant information, but it should also serve expert forecasters too, as their subject matter knowledge might make experts over-reliant on inside view cues or prone to select very narrow reference classes. Integration of metacognitive training techniques into the system 100 via the metacognitive training subcomponent 124 can advantageously improve forecasters' resistance to common biases in predictive judgment. The metacognitive training subcomponent 124 can be enabled or disabled by the system administrator for users who have used the system 100 more than once. Additional training via the metacognitive training subcomponent 124 can be administered to users after the first session, featuring already presented or new content.

The intake subcomponent 126 can be execute to perform psychometric and individual difference intake tests. The psychometric tests and individual difference tests can measure cognitive abilities and propensities of a user, and can be used as weighting inputs to aggregation schemas described herein. The intake subcomponent 126 consists of data collected about each user. Such data may be collected and processed externally to the system, and then inputted into the system for processing to inform scoring and aggregation.

The question selection component 130 can be executed to allow a user to select a question, for which to submit reference class selection information and predictive estimates. For example, after a user logs into the system 100, the user may be presented with a list of selectable questions. Each question can be posed about events with unknown outcomes. For example, the question may refer to a future event whose outcome is unknown. The user can view basic information about the question, including the resolution criteria, i.e. the ways in which the outcome of the question will be judged. Inputs to the question selection component 130 can be received from human users and/or can be sourced from statistical methods yielding reference class selections. The question selection component can render one or more of the GUIs to receive selections from users of prediction questions from a menu with one or more items/options.

The questions presented by the question selection component 130 can be associated with an underlying set of data in one or more databases from which reference classes are to be derived (e.g., reference case databases and/or historical cases databases), where different questions can be associated with different sets of data and/or different databases. The selection of a questions by a user provides instructions to the system as to how subsequent GUIs should be populated and presented to the user such that the GUIs and the options in the GUIs can be specific to the database(s) associated with the selected question. The question selection component, via the GUIs can allow the user to select predictive variables and values for the predictive variables specific to the underlying sets of data in the database(s) associated with the selected question, where selection of the predictive variables and values for the predictive variables can be used by the system 100 to characterize a reference class and/or can allow the user to select individual reference cases via the GUIs. In response to receiving the selections from the user, the question selection component 130 can query a database in real-time and can update a number of cases associated with the selected reference class in the database.

The prediction elicitation component 140 can be executed to render one or more of the GUIs 112 to present a user with a question for which the user is tasked with providing a probabilistic estimate. The prediction elicitation component 140 can programmed to receive a preliminary quantitative predictive estimate from a user before the system 100 allows the user to proceed to the class definition component 150. A system administrator can configure the system to 100 to display or not display the prediction elicitation component 140 to users for a given set of questions.

The class definition component 150 can be executed to define a reference class. The class definition component 150 can render one or more of the GUIs 112 providing classification variables as well as categories or levels of the classification variables, where the classification variables and categories or levels of classification variables can be specific to the underlying set of data in the reference case database(s) associated with the selected question. The class definition component 150 can receive selections from user-selected classification variables as well as appropriate categories or levels of the classification variables, and the system can automatically generate one or more database queries based on the input selections from the user to provide access to and discovery of data in the sets of data in the reference case database(s) associated with the selected question via the queries that are automatically generated. As additional selections reference class criterion are received by the class definition component 150 from the user, the class definition component 150 can generate narrower queries and can define the reference class with increasing specificity such that the class definition component 150 can maintain or reduce the size of a resulting reference class based on the narrowing (more specific) queries.

In some embodiments, related cases can be individually and manually selected by a user from the reference case database, rather than defined through variable-level pairs.

For categorical (i.e. discrete) classification variables, the system can receive one or more category values from the user as an inclusion criterion. For continuous variables, the class definition component 150 can receive selections from a user that correspond to a range of quantiles or absolute values via the GUIs 112. Multiple classification variables and value/category selections can be received from the user via the GUIs 112 to refine a reference class. In response to selection or updating of a reference class, the class definition component 150 can automatically query a database of historical cases (e.g., a historical cases database) and can display a number of cases belonging to the selected reference class via the GUIs 112. As additional selections of historical cases are received by the class definition component 150 from the user, the class definition component 150 can generate increasingly broader queries and can define the reference class with an increasingly generalized reference class such that the class definition component 150 can maintain or increase the size of the resulting reference class by generating queries that become increasing generalized. The class definition component 150 can allow a user to access background information on the reference cases, but can prevent the user from viewing outcome (from which base rates are calculated) information, which can advantageously impede the user from creating reference classes that deliberately match preconceived notions.

The base rate component 160 can be executed to calculate one or more base rate estimates based on the data retrieved from the database(s) (e.g., reference case database and/or historical cases database) associated with the selected question in response to the queries from the reference class definition component 150 and the reference class defined by the class definition component 150. The base rate component 160 can render one or more of the GUIs 112 to display one or more resulting reference classes defined by the user(s), resulting base rate estimates for each class, and/or a combined base rate estimate (e.g., an overall base rate across reference classes defined by the user). The base rate estimate calculations performed by the base rate component 160 can include frequency of historical event occurrence (number of events divided by number of reference cases), descriptive statistics (mean, median, standard deviation) for a continuous variable, and/or time-specific probabilistic estimates derived from survival analysis associated with the reference class. The base rate component 160 can store the base rate estimates in a base rate database and can associate the base rate estimates with the selected references classes stored in a reference class database.

The adjustment elicitation component 170 can be executed to render one or more of the GUIs to receive manual adjustments to the probability estimate and/or base rate estimates from a user. These manually adjustment can be useful for capturing inside-view cues that are unique to the selected question, or for questions where the underlying database does not include the variables needed to construct an optimal reference classes. Users can be asked to share rationales for manual adjustments, by typing in a text field of the GUIs. After any manual adjustments are received, the system 100 arrives at a final predictive estimate. The manual adjustments and final probabilistic estimates for each user are stored in a estimates database.

The scoring, aggregation, and reporting component 180 can be executed to calculate aggregative predictive estimates (APEs) on the basis of pre-defined aggregation schemas and algorithms. The component 180 can update the APEs when a user submits new inputs to the system 100. The APEs can be displayed to other users (forecasters), or instead displayed only to system administrators via the GUIs. The component 180 can include a scoring subcomponent 182, an aggregation sub component 184, and a report subcomponent 186. New information on prediction questions can be received from an administrator of the system 100. For example, resolution data or observed values for one or more questions can be received from the user. The receipt of the new information can trigger updates to the accuracy scores and/or aggregation schemas described herein.

The scoring subcomponent 182 can be executed to score users based on their accuracy in resolving a question based on probabilistic estimates provided by the user for the questions. For example, when outcomes of prediction cases are known, the administrator enters outcome information into the system 100, which can be referred to as question resolution or case resolution. As cases are resolved, the scoring subcomponent 182 automatically generates accuracy scores for users that provided probabilistic estimates, and the accuracy scores can be made available for display to users. Predictive cases can be resolved instantly, in the same user sessions, or take days, weeks or months to resolve. Thus, users can view the results upon using the system after case resolution. The scores can be generated using scoring rules, such as the Brier score for probability forecasts, binary outcomes, and/or categorical outcomes, and/or scores can be generated using mean squared error for continuous forecasts. The scores are calculated on the basis of the reference class assignments, as well as the final adjusted inputs. The scores can be a weighted combination of estimates provided by a user for a given case, including base rate estimates generated by the system 100 on the basis of user-generated reference class definitions, as well as predictive/probabilistic estimates entered by the user.

The aggregation subcomponent 184 can be executed to collect and aggregate inputs and probabilistic estimates from multiple users for a given question. In some embodiments, after at least a specified number of users (e.g., three users) have provided probabilistic estimates for a given case, the aggregation component can be automatically executed to collect and aggregate the inputs and probabilistic estimates from those users. As additional users enter their probabilistic estimates for case that has not yet been resolved, the aggregation subcomponent 184 can incorporate the inputs and the probabilistic estimates from the additional users into the aggregated data. The aggregation subcomponent 184 can automatically generate, or can generate upon request from a system administrator, that aggregate quantitative predictive estimates, range, variance and other quantitative descriptions of the predictive estimates are generated based on the aggregated inputs and probabilistic estimates. The base rate and final probabilistic estimates submitted by each of the user for a given case can be aggregated into an aggregate predictive estimate for the given case by the aggregation subcomponent 184. The aggregate estimates can be updated each time a user submits new information to the system 100 for the case. In some embodiments the aggregation subcomponent 184 can use a simple unweighted mean or median, or can use a weighted mean or median approach to generate the aggregate estimate, taking into account past accuracy of each user, properties of defined reference classes, or other characteristics of each user as weighting inputs. In some embodiments, each of the users estimates for a given case can be aggregated using regression-based or machine learning methods.

The report subcomponent 186 can be executed to generate one or more reports incorporate based on information provided by or derived from the users, including reference class assessments, final predictive/probabilistic estimates and any textual information such as rationales provided by the users. The one or more reports can also include aggregated inputs and/or can incorporate the generated aggregate quantitative predictive estimates, ranges, variances and other quantitative descriptions of the predictive estimates that are generated by the aggregation subcomponent 184 based on the aggregated inputs and probabilistic estimates. The report can include a qualitative section providing user rationales. The qualitative section can include a complete set of rationales and/or can include a summary of rationales generated by the system 100 using topic modeling or other natural language processing techniques. The report subcomponent 186 can generate a pre-formatted report for each case.

The admin component 190 can be executed to allow an administrator (i.e. admin user) to upload, specify, or update a database with historical cases used for reference class definition and base rate calculation for a question. This can be performed by uploading an external data structure that corresponds to the data in the database(s) from which reference classes are to be derived. In a non-limiting example, the data structure can be a table, in Excel, Comma Separated Value or other table format. The table has a pre-defined structure, with one or more columns (variables) designated as dependent variable. If more than one dependent variable is included, the default variable can be selected by either the administrator of the user. The values of the variable(s) are used to generate base rate estimate. Other columns (variables) are designated as predictor variables and are shown as options in the GUIs for users to select these variables to define reference classes in the class definition component 150. The treatment of predictor variables in component 150 may differ by whether the variables are categorical or continuous, in which case the uploaded data includes designations of said predictor variables as either categorical or continuous. Larger changes to the reference class database, such as redefining or adding predictive variables, can be performed as well. Such changes may involve direct changes to computer code, rather than interacting exclusively through a graphical user interface.

Figure 2:
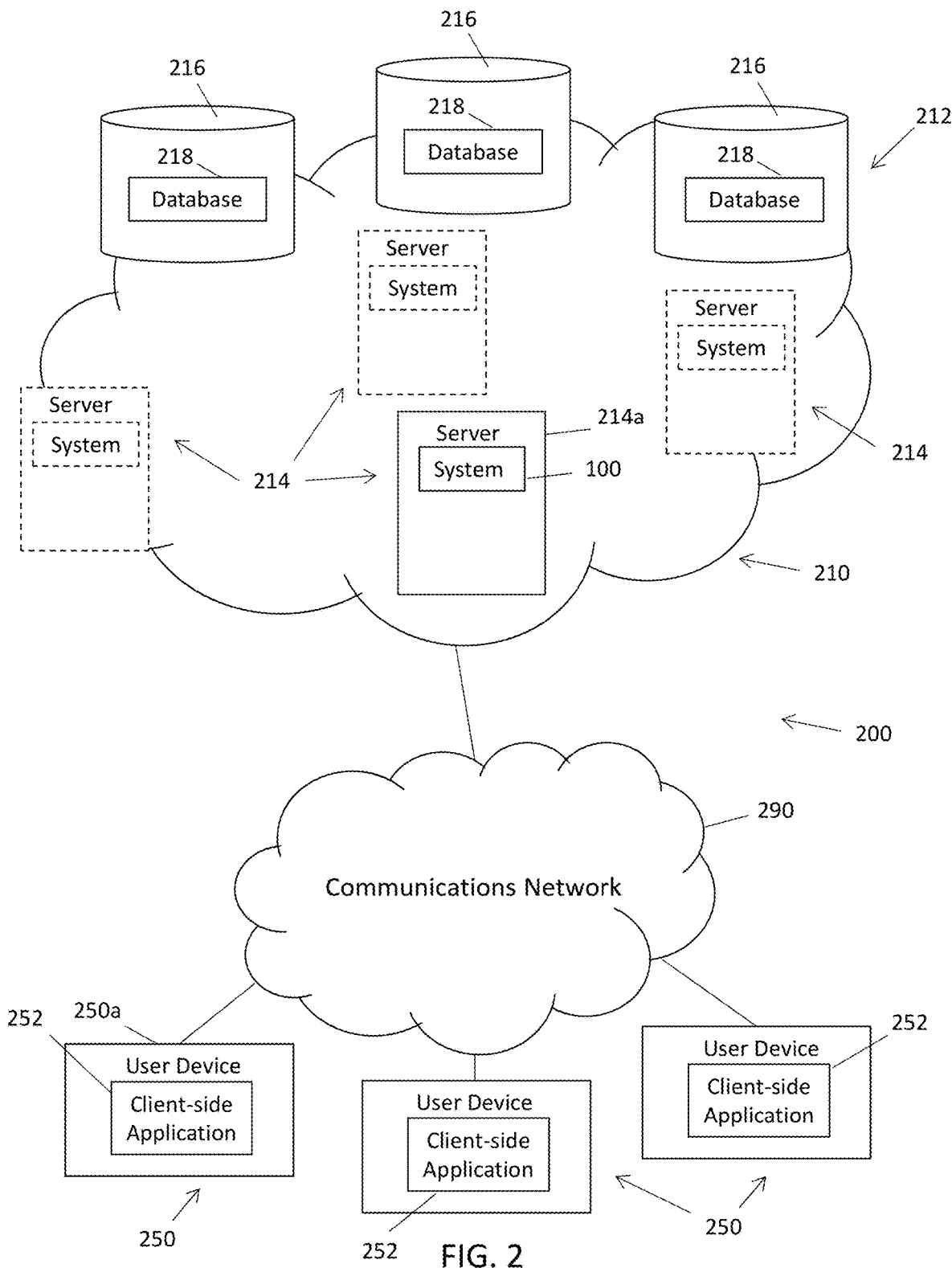
FIG. 2 depicts a computing environment within which embodiments of the present disclosure can be implemented.
Figure 3:
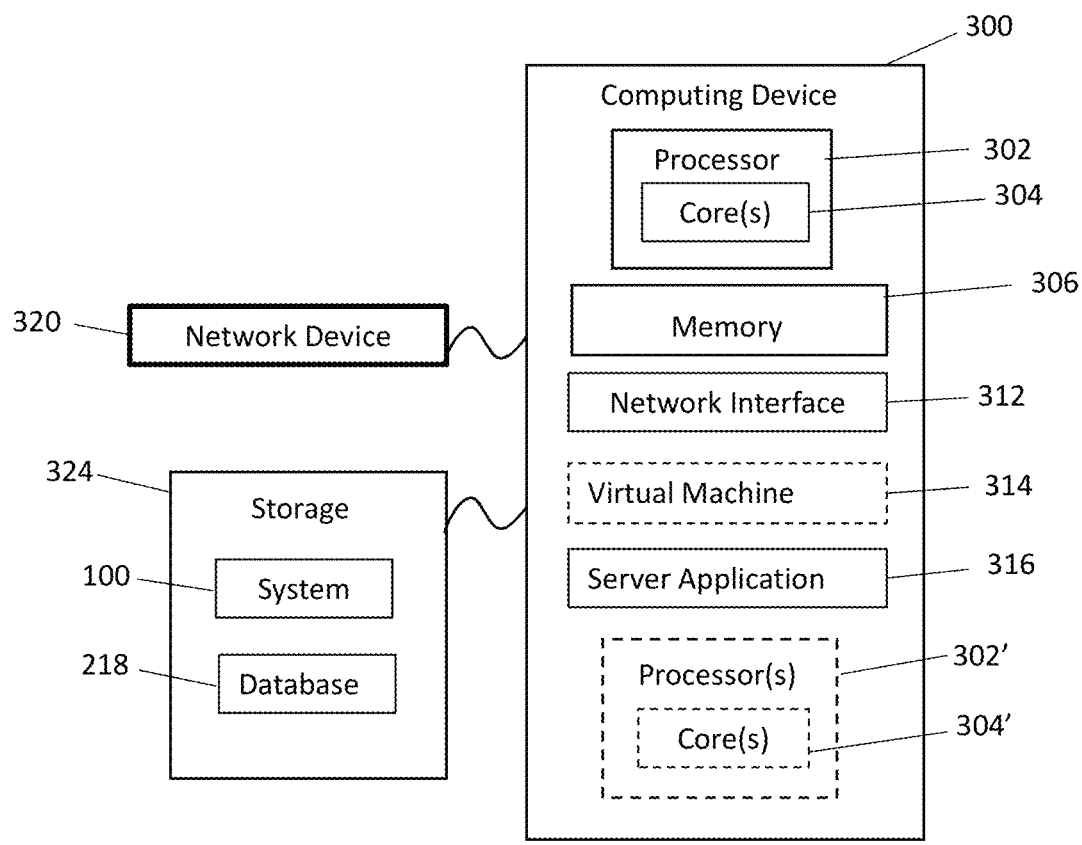
FIG. 3 is a block diagram of an exemplary computing device for implementing one or more of the servers in accordance with embodiments of the present disclosure.

FIG. 2 shows a computing environment within which embodiments of the present disclosure can be implemented. As shown in FIG. 2, the environment 200 can include distributed computing system 210 including shared computer resources 212, such as servers 214 and (durable) data storage devices 216, which can be operatively coupled to each other. For example, two or more of the shared computer resources 212 can be directly connected to each other or can be connected to each other through one or more other network devices, such as switches, routers, hubs, and the like. Each of the servers 214 can include at least one processing device and each of the data storage devices 216 can include non-volatile memory for storing databases 218. The databases 218 can store data 220 including, for example, user profile information/data, cases/questions, case resolution data/information, and user inputs (e.g., class predictions, class definition, probabilistic estimates, historical reference class data, aggregated data/information, historical case data and/or any other suitable data/information). In exemplary embodiments, the databases can include a reference class database, a historical cases database, and a case database. An exemplary server is depicted in FIG. 3.

Any one of the servers 214 can implement instances of the system 100 and/or the components thereof. In some embodiments, one or more of the servers 214 can be a dedicated computer resource for implementing the system 100 and/or components thereof. In some embodiments, one or more of the servers 214 can be dynamically grouped to collectively implement embodiments of the system 100 and/or components thereof. In some embodiments, one or more servers can dynamically implement different instances of the system 100 and/or components thereof.

Figure 4:
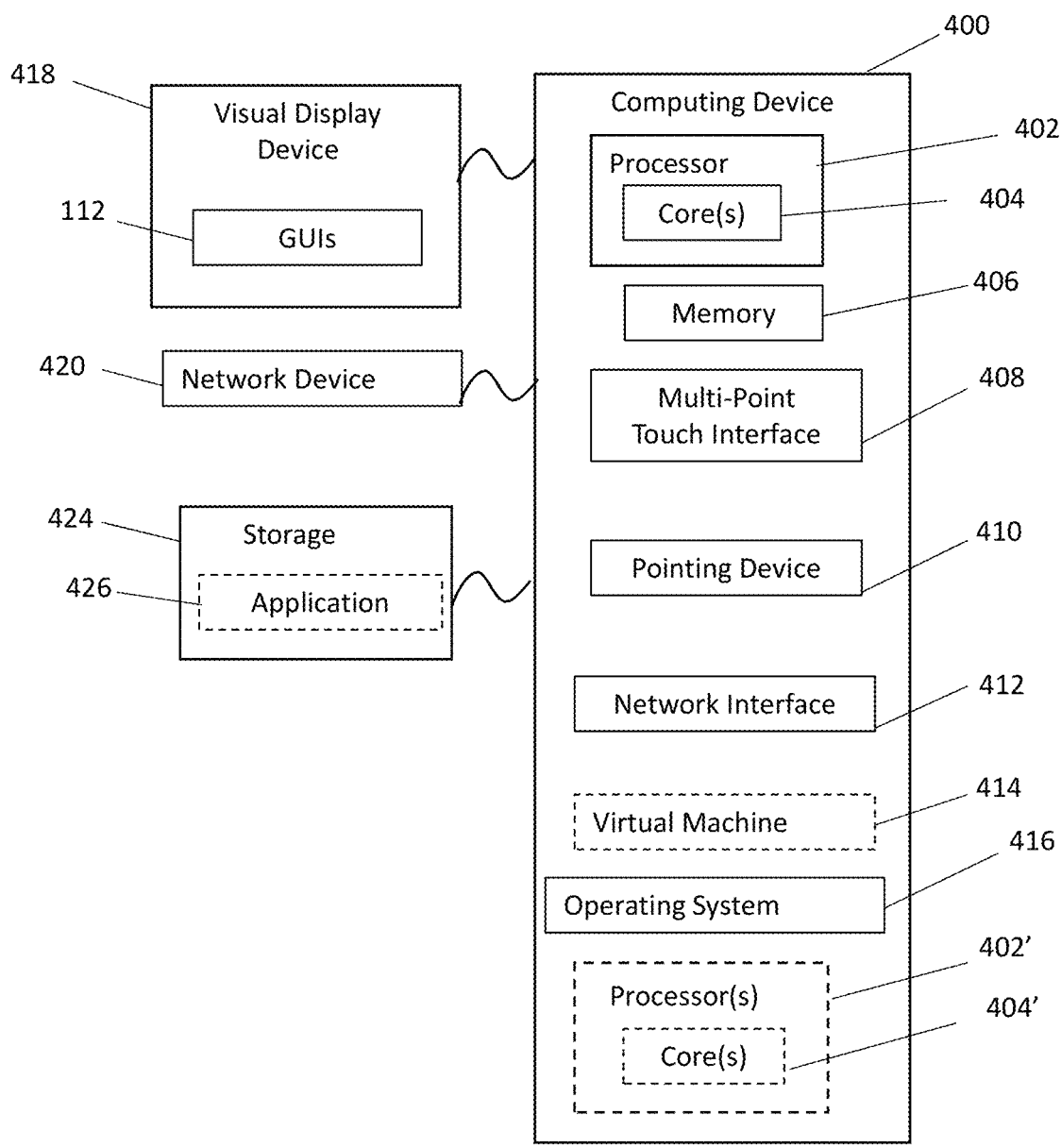
FIG. 4 is a block diagram of an exemplary computing device for implementing one or more of the user devices in accordance with embodiments of the present disclosure.

The distributed computing system 210 can facilitate a multi-user, multi-tenant environment that can be accessed concurrently and/or asynchronously by user devices 250. For example, the user devices 250 can be operatively coupled to one or more of the servers 214 and/or the data storage devices 216 via a communication network 290, which can be the Internet, a wide area network (WAN), local area network (LAN), and/or other suitable communication network. The user devices 250 can execute client-side applications 252 to access the distributed computing system 210 via the communications network 290. The client-side application(s) 252 can include, for example, a web browser and/or a specific application (e.g., a mobile application) for accessing and interacting with the system 100. An exemplary user device is depicted in FIG. 4.

In exemplary embodiments, the user devices 250 can initiate communication with the distributed computing system 210 via the client-side applications 252 to establish communication sessions with the distributed computing system 210 that allows each of the user devices 250 to utilize the system 100, as described herein. For example, in response to the user device 250a accessing the distributed computing system 210, the server 214a can launch an instance of the system 100, which, for example, can generate an instance of the registration component 120 if it is the user's first time interacting with the system 100. Otherwise, the server 214a can execute the system 100 to generate an instance of the question selection component 130. In embodiments which utilize multi-tenancy, if an instance of the system 100 has already been launched, the instance of the system 100 can process multiple users simultaneously. The server 214a can execute instances of each of the components of the system 100 according to embodiments of the workflow process as described herein. The users can interact in a single shared session associated with the system 100 and components thereof or each user can interact with a separate and distinct instance of the system 100 and components thereof, and the instances of the systems and components thereof.

Upon being launched, the system 100 can identify the current state of the data stored in the databases in data storage locations of one or more of the data storage devices 216. For example, the server 214a can read the data from the databases in one or more data storage devices 216 and can store the current state and data values in one or more memory devices across one or more of the servers 214 to create a cache of the state and data (e.g., the server 214a can create an in-memory version of the state and data from databases). The state and data retrieved can be related to one or more workflows for one or more fields or applications via embodiments of the system 100. Based on the cached state and the system 100 executed, for example, by the server 214a, the workflow process can begin at a point in the workflow corresponding to the cached state.

FIG. 3 is a block diagram of an exemplary computing device 300 for implementing one or more of the servers 214 in accordance with embodiments of the present disclosure. In the present embodiment, the computing device 300 is configured as a server that is programmed and/or configured to execute one of more of the operations and/or functions for embodiments of the environment described herein (e.g., system 100) and to facilitate communication with the user devices described herein (e.g., user device(s) 250). The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 306 included in the computing device 300 may store computer-readable and computer-executable instructions or software for implementing exemplary embodiments of the components/modules or portions thereof described herein as being implemented, for example, by the servers 214 and/or can provide a cache for maintaining the state and data associated with one or more users and/or one or more cases/questions stored by one or more data storage devices operatively coupled to the computing device 300. The computing device 300 also includes configurable and/or programmable processor 302 and associated core 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for controlling system hardware. Processor 302 and processor(s) 302' may each be a single core processor or multiple core (304 and 304') processor.

Virtualization may be employed in the computing device 300 so that infrastructure and resources in the computing device may be shared dynamically. One or more virtual machines 314 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof.

The computing device 300 may include or be operatively coupled to one or more data storage devices 324, such as a hard-drive, CD-ROM, mass storage flash drive, or other computer readable media, for storing data and computer-readable instructions and/or software that can be executed by the processing device 302 to implement exemplary embodiments of the components/modules described herein with reference to the servers 214.

The computing device 300 can include a network interface 312 configured to interface via one or more network devices 320 with one or more networks, for example, a Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections (including via cellular base stations), controller area network (CAN), or some combination of any or all of the above. The network interface 312 may include a built-in network adapter, network interface card, PCMCIA network card, card bus network adapter, wireless network adapter, USB network adapter, modem or any other device suitable for interfacing the computing device 300 to any type of network capable of communication and performing the operations described herein. While the computing device 300 depicted in FIG. 3 is implemented as a server, exemplary embodiments of the computing device 300 can be any computer system, such as a workstation, desktop computer or other form of computing or telecommunications device that is capable of communication with other devices either by wireless communication or wired communication and that has sufficient processor power and memory capacity to perform the operations described herein.

The computing device 300 may run any server application 316, such as any of the versions of server applications including any Unix-based server applications, Linux-based server application, any proprietary server applications, or any other server applications capable of running on the computing device 300 and performing the operations described herein. An example of a server application that can run on the computing device includes the Apache server application.

FIG. 4 is a block diagram of an exemplary computing device 400 for implementing one or more of the user devices (e.g., user devices 250) in accordance with embodiments of the present disclosure. In the present embodiment, the computing device 400 is configured as a client-side device that is programmed and/or configured to execute one of more of the operations and/or functions for embodiments of the environment described herein (e.g., client-side applications 252) and to facilitate communication with the servers described herein (e.g., servers 214). The computing device 400 includes one or more non-transitory computer-readable media for storing one or more computer-executable instructions or software for implementing exemplary embodiments of the application described herein (e.g., embodiments of the client-side applications 252, the system 100, or components thereof). The non-transitory computer-readable media may include, but are not limited to, one or more types of hardware memory, non-transitory tangible media (for example, one or more magnetic storage disks, one or more optical disks, one or more flash drives), and the like. For example, memory 406 included in the computing device 400 may store computer-readable and computer-executable instructions, code or software for implementing exemplary embodiments of the client-side applications 252 or portions thereof.

The computing device 400 also includes configurable and/or programmable processor 402 and associated core 404, and optionally, one or more additional configurable and/or programmable processor(s) 402' and associated core(s) 404' (for example, in the case of computer systems having multiple processors/cores), for executing computer-readable and computer-executable instructions, code, or software stored in the memory 406 and other programs for controlling system hardware. Processor 402 and processor(s) 402' may each be a single core processor or multiple core (404 and 404') processor.

Virtualization may be employed in the computing device 400 so that infrastructure and resources in the computing device may be shared dynamically. A virtual machine 414 may be provided to handle a process running on multiple processors so that the process appears to be using only one computing resource rather than multiple computing resources. Multiple virtual machines may also be used with one processor.

Memory 406 may include a computer system memory or random access memory, such as DRAM, SRAM, MRAM, EDO RAM, and the like. Memory 406 may include other types of memory as well, or combinations thereof.

A user may interact with the computing device 400 through a visual display device 418, such as a computer monitor, which may be operatively coupled, indirectly or directly, to the computing device 400 to display one or more of graphical user interfaces that can be provided by the client-side applications 252 and/or the system 10 in accordance with exemplary embodiments. The computing device 400 may include other I/O devices for receiving input from a user, for example, a keyboard or any suitable multi-point touch interface 408, and a pointing device 410 (e.g., a mouse). The keyboard 408 and the pointing device 410 may be coupled to the visual display device 418. The computing device 400 may include other suitable I/O peripherals.

The computing device 400 may also include or be operatively coupled to one or more storage devices 424, such as a hard-drive, CD-ROM, or other computer readable media, for storing data and computer-readable instructions, executable code and/or software that implement exemplary embodiments of an application 426 or portions thereof as well as associated processes described herein.

The computing device 400 can include a network interface 412 configured to interface via one or more network devices 420 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 412 may include a built-in network adapter, network interface card, PCMCIA network card, card bus network adapter, wireless network adapter, USB network adapter, modem or any other device suitable for interfacing the computing device 400 to any type of network capable of communication and performing the operations described herein. Moreover, the computing device 400 may be any computer system, such as a workstation, desktop computer, server, laptop, handheld computer, tablet computer (e.g., the iPad™ tablet computer), mobile computing or communication device (e.g., the iPhone™ communication device), point-of sale terminal, internal corporate devices, or other form of computing or telecommunications device that is capable of communication and that has sufficient processor power and memory capacity to perform the processes and/or operations described herein.

The computing device 400 may run any operating system 416, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the processes and/or operations described herein. In exemplary embodiments, the operating system 416 may be run in native mode or emulated mode. In an exemplary embodiment, the operating system 416 may be run on one or more cloud machine instances.

Figure 5:
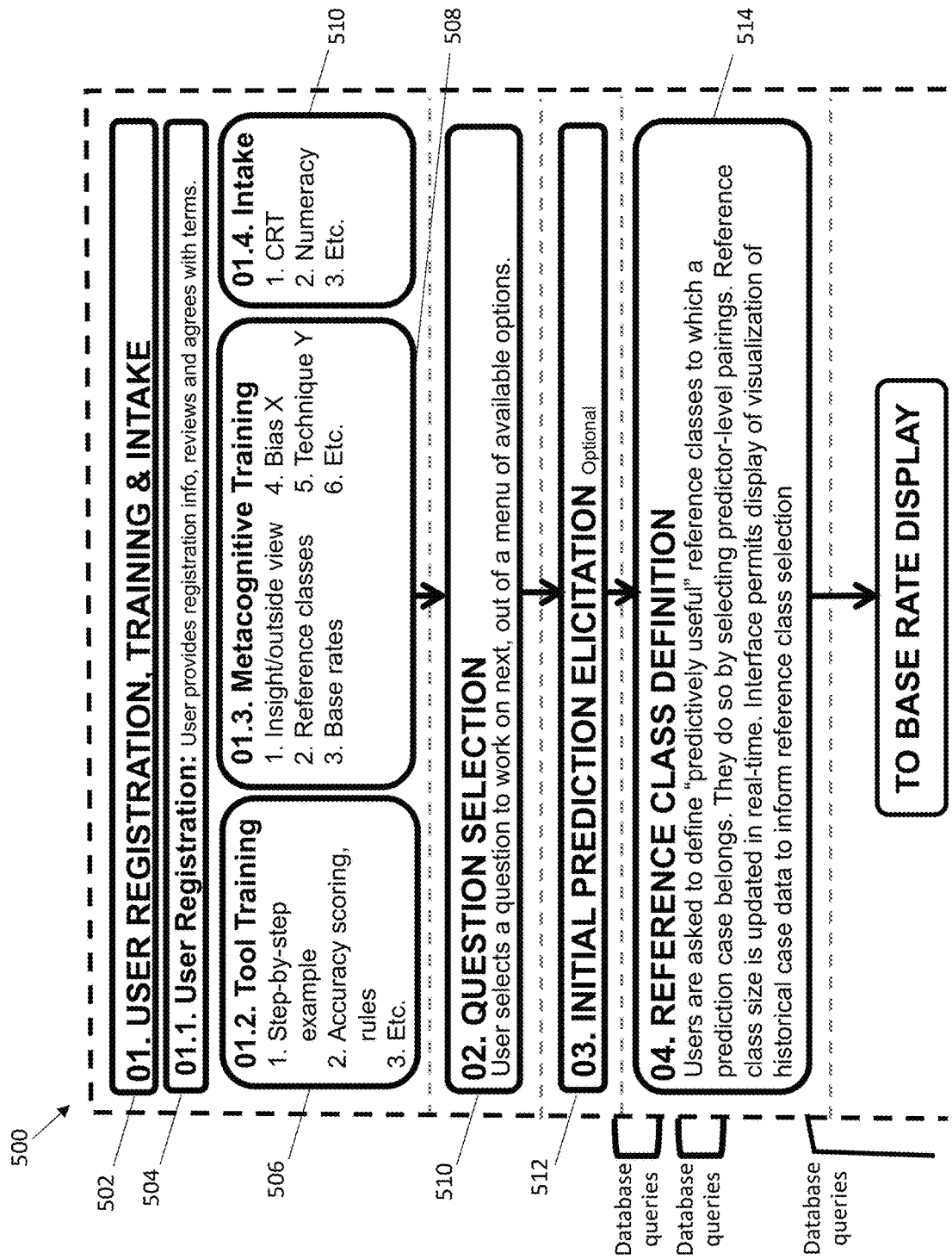
FIG. 5 depicts a schematic illustrating the overall operation of the system in accordance with embodiments of the present disclosure.
Figure 5:
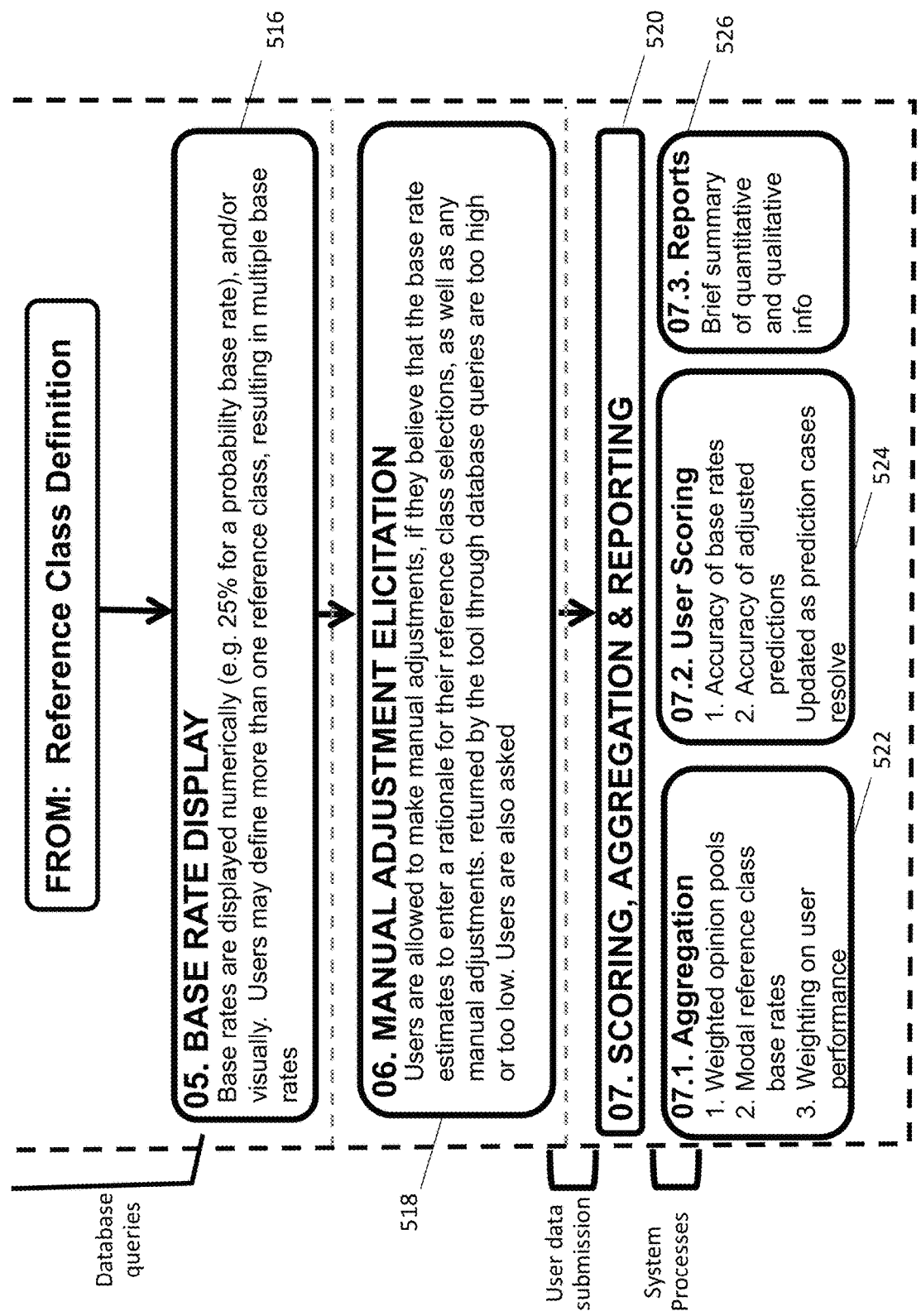

FIG. 5 depicts a non-limiting example of an operation of an embodiment of the system 100 using an exemplary workflow process 500 for a sample iteration for clinical trial predictions. Although the sample iteration is described with reference to clinical trial predictions, embodiments of the systems are not limited to the field of clinical trial prediction or life sciences application, but can be implemented in a broad range of fields and applications for which multi-source reference class identification, base rate calculation, and prediction can be utilized.

The operation of the system can be configured to so that the workflow has a specified order and/or timing. A system administrator can vary the order and/or timing to provide flexibility and adjustability for different environments and applications. Initially, the workflow begins, at step 502, with an insertion of a prediction problem and users registering with the system. At step 504, as an example, users can enter their user names, contact information, and areas of subject matter expertise. After users have completed the registration, the system advances first-time users to training on how to use the system at step 506. The workflow and functionality of the system can execute a tool training component to provide demonstrations of example reference class definitions and forecast submissions, which can be illustrated via media including, but not limited to, still images, animations, videos, audio, etc. This demonstrative media can inform users how to perform tasks using the system and its associated databases (using examples that may be generic or specific to a given subject matter area), as well as how their performance can be scored. The tool training component can, but does not necessarily, include detailed advice on achieving optimal performance. In first-time use of the system, tool training component can be succeeded by the metacognitive training component at step 508 as well as psychometric and individual difference intake tests at step 510 that may be required to complete an instantiation's workflow.

During user registration, training, and intake (steps 502-510), users can be asked to complete psychometric measures. The psychometric scores from these measures can be used as inputs to aggregation schemas. The system may use existing (published) psychometric measures, as well as proprietary psychometric measures, such as those that measures the extent to which users have achieved, or have the propensity to achieve, high-level of competence in multiple fields.

After user registration, training, and intake is completed, the system 100 advances to the problem elicitation components of the system. First, at step 512, the system 100 receives input from a user corresponding to selection of a prediction question from a menu with one or more items. One or more databases can be associated with each of the questions before the questions can be selected by a user. As non-limiting example, an administrator can upload data structure the system 100 that can be used by the system 100 to configure GUIs based on the database(s) associated with the questions. After a question is selected from the menu by the user, at step 512, the user interface of the system presents the user with a workspace in which the user is tasked with providing a probabilistic estimate for the selected question. An example of a question can be "What is the probability of advancement of a cancer drug X in trial Y from Phase II to Phase III?" The system provides the user with processes which are connected to a historical database of clinical trials with known outcomes. The present example focuses on probabilistic predictions for binary outcomes (e.g. yes versus no, or advancement versus no advancement), but variant examples are not limited to binary expression and can be deployed on continuous outcome variables (e.g. time, expenditures, or growth rates), and any combinations of categorical and continuous variables.

Figure 7:
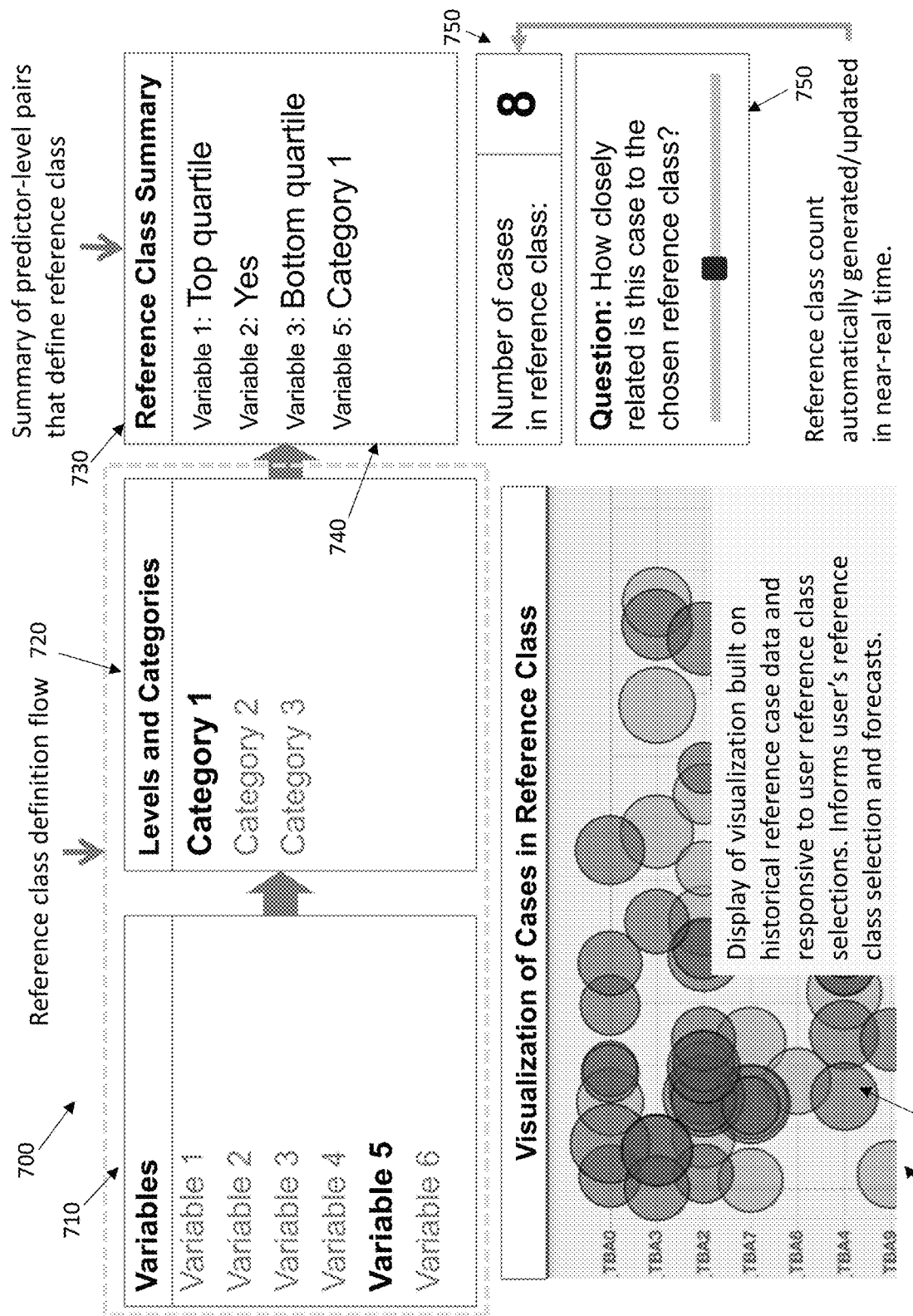
FIG. 7 depicts an example electronic user interface for the elicitation process through which users define reference classes and view base rates in accordance with embodiments of the present disclosure.

After selecting a question, the user interface of the system can present the user with the case at hand, including a basic description of the trial and the therapeutic compound. Users can be asked for an optional initial predictive estimate, during an initial prediction elicitation operation in response to execution of a initial prediction elicitation component (step 512). After the initial prediction elicitation is complete, the system advances to the reference class definition component at step 514, an example of which is illustrated in FIG. 7. The reference class definition component can receive inputs from the user corresponding to classification variable-level pairs and/or related cases, and can automatically generate one or more database queries based on the input selections from the user to provide access to and discovery of data in the sets of data in the database(s) associated with the selected question via the queries that are automatically generated.

After the user has defined the reference classes, as well as reviewed any available visualizations based on the ingested data and reference class selections, the system 100 proceeds to a base rate display component at step 516, where resulting reference classes, resulting base rates for each class, and combined base rate are displayed via the user interface. The combined base rate can be calculated using a simple mean of base rate, or a weighted mean that incorporates class size and similarity ratings. At step 518, the system proceeds to the elicitation adjustment component through which a user can make manual adjustments to the probability estimate in response to execution of a manual adjustment elicitation component of the system. Such adjustments can be useful in capturing inside-view cues that are truly unique to the case at hand, or for cases where the underlying database does not include the variables needed to construct an optimal reference classes. Users can be asked to share rationales for manual adjustments, by typing in a text field of the user interface. Rationales can be used to capture new features, or to study the types of rationales that are associated with beneficial manual adjustments, or accurate predictions more generally. After a user has entered the rationale(s) and associated information, the user submits the data to the system and can move on to select and work on another question within the same session, review scores, or end the session. The sequence of reference class definition, base rate display and manual adjustment elicitation (steps 514-518) can be fixed, i.e. the system 100 does not allow reconfiguration of these three components in any other order relative to one another.

After the system has registered and stored at least one user's predictive inputs, the system proceeds to the scoring aggregation, and reporting component at step 520 and calculates aggregate predictive estimates (APEs) at step 522 on the basis of pre-defined aggregation schemas and algorithms. APEs can be updated every time a user submits new inputs to the system. APEs can be displayed to other users (forecasters), or instead displayed only to system administrators via the user interface.

When outcomes of questions are known (e.g. when clinical trial Y publishes results and a decision whether or not to extend drug trial program to Phase III becomes known) the administrator enters this information, which is commonly referred to as question resolution or case resolution. When questions are resolved, accuracy scores can be automatically calculated by the system at step 524 in response to execution of the scoring, aggregation and reporting component and can be made available for display to users. Questions can be resolved instantly, in the same user sessions, or take days, weeks or months to resolve. Thus the user can view the results upon using the system after question resolution.

When the system has collected inputs from at least three users on a given question, the system, upon administrator request or automatically, can be executed to generate a report summarizing aggregate quantitative predictive estimates, range, variance and other quantitative descriptions of the predictive estimates at step 526. A qualitative section of the report including user rationales can be generated by the system as well. The qualitative section can include a complete set of rationales and/or can include a summary of rationales generated by the system using topic modeling or other natural language processing techniques.

Figure 6:
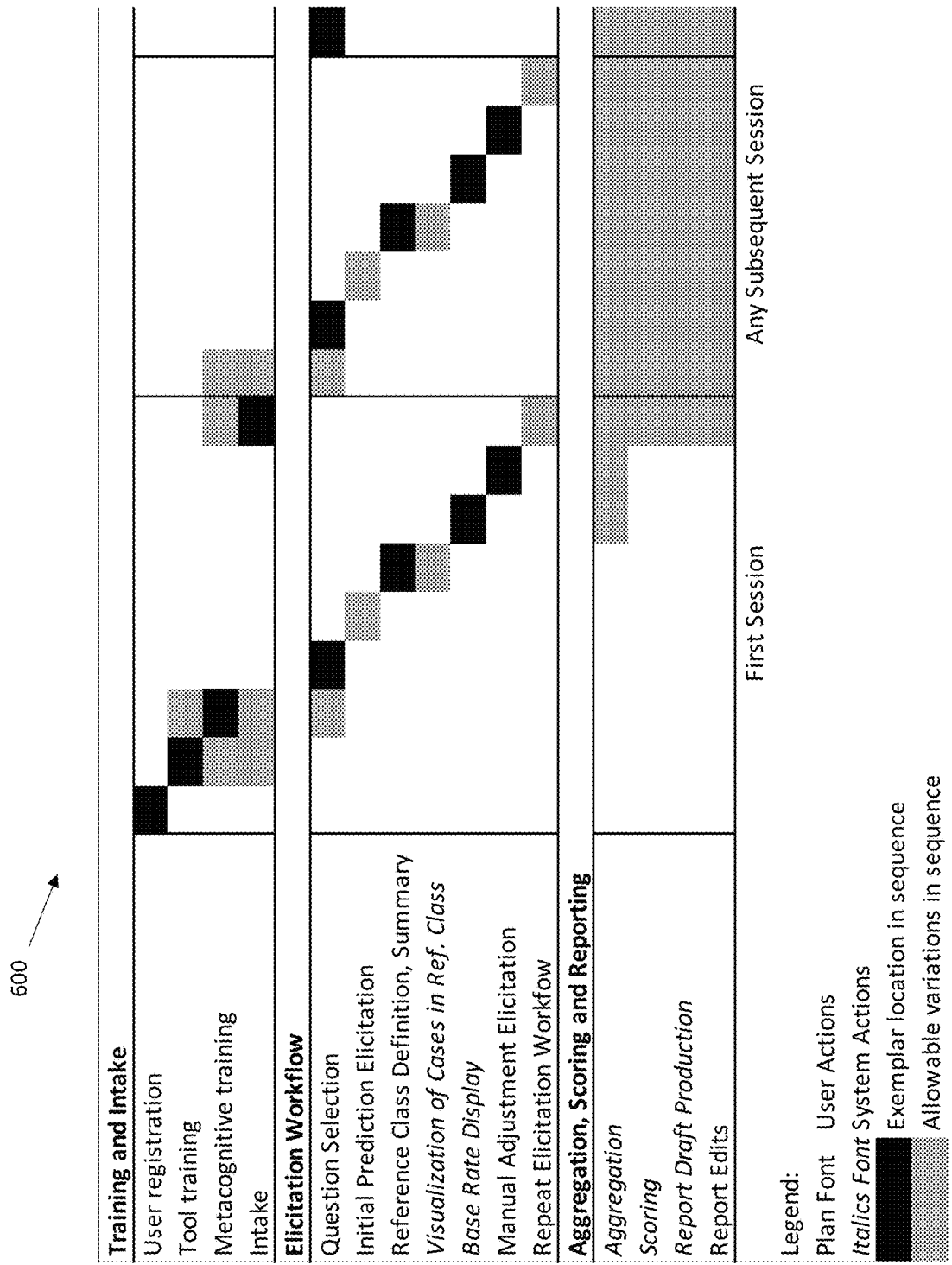
FIG. 6 depicts an exemplary sequence of operations within a workflow, and allowable variations of this sequence in N (first-time exposure) and N+1 (all exposures beyond the first-time exposure) in accordance with embodiments of the present disclosure.

FIG. 6 depicts an exemplary sequence of operations 600 within a workflow process of embodiments of the system 100, and allowable variations of this sequence in N (first-time exposure) and N+1 (all exposures beyond the first-time exposure) in accordance with embodiments of the present disclosure. As shown in FIG. 6, when a user uses the system 100 for the first time, the system operates to facilitate registration, training, and intake, and then proceeds to an elicitation workflow and an aggregation, scoring, and reporting workflow. When the user uses the system a second time (or any time after the first time), the system skips the registration and tool training steps, and metacognitive training and intake testing can be optionally executed.

FIG. 7 depicts an example electronic graphical user interface 700 for the elicitation process through which users define reference classes and view base rates in accordance with embodiments of the present disclosure. As shown in FIG. 7, the user interface 700 can include a data entry field 710 through which a user can specify one or more classification variables for one or more databases (e.g., reference case databases) associated with a question selected by the user and a data entry field 720 through the user can specify levels or categories for the selected classification variables based on the underlying database(s) associated with the selected question. The data entry fields 710 and 720 can be presented in the form of drop down menus with selectable options or can be presented in other manners. To define a reference class, the user first selects a classification variable from the user interface, then chooses the appropriate category or level of this variable from the user interface. For example, the user may select a Trial Phase variable, and indicate that the reference class should contain only Phase II clinical trials. The selections of the classification variables and levels can cause the system to automatically generate and execute one or more queries against the underlying database(s) associated with the question. In the absence of this selection, the reference class results from the query would contain a larger number of cases, e.g. trials in Phases II and III. Thus, in the present example, every additional selection causes the system 100 to narrow the query to maintain or reduce the size of the resulting reference class. In an alternative embodiment of the system, related cases can be selected manually (individually or in small groups) from a database (e.g., a database of historical cases), rather than defined through variable-level pairs. For continuous variables, the user can select a range of quantiles (e.g. most recent 50% of trials) or absolute values (e.g. trials initiated between 2014 and 2017) via the user interface. Multiple classification variables and value/category selections can be entered in the user interface to refine a reference class.

As the user selects and refines the reference class, the system can display visualizations 760 based on the system's ingested data to inform the user's reference class selections and forecasts. The visualizations 760 can include one or more graphic 762 corresponding to a case stored in the database associated with the question selected by the user which was returned as part of the reference class based on the queries that were automatically generated in response input selections from the user via the reference class definition component. The graphics 762 in the visualizations can be encoded to convey information out the associated cases represented by the graphics. For example, the shape, size, color, and/or shading the graphics 762 can vary depending on the underlying data of the cases represented by the graphics 762. By arranging the graphics 762 relative to each other in the visualization 760, the visualization 760 can convey information about a relation of the data associated with the different cases. A user can hover over or select the graphics to reveal additional data about the cases. As a non-limiting example of predicting the outcomes of pharmaceutical clinical trials, the size of the graphics can represent the number of participants in a clinical trial (historical case), the color or shade of the graphics 762 can represent the type of clinical trial, and position of the graphics relative to each other can represent the disease area for which the trial is targeted.

After selection of the classification variables and the levels/categories, the user interface 700 can output a summary 730 that summarizes variable-level combinations selected by the user. When a reference class is selected or updated, the system queries the historical cases database and displays the number of cases 740 belonging to the selected reference class via the user interface 700. The user can access background information on the reference cases, but may not view outcome (from which base rates are calculated) information at that component of the workflow. Preventing the user from viewing the outcome information at class definition component of the workflow advantageously impedes the user from creating reference classes that deliberately match preconceived notions. An example of this issue would be an optimistic user who defines a reference class that contains mostly successful trials. The user interface 700 can also include a data entry field 750 through which the user can specify a similarity rating corresponding to how closely the reference class is related to the current question.

Figure 8:
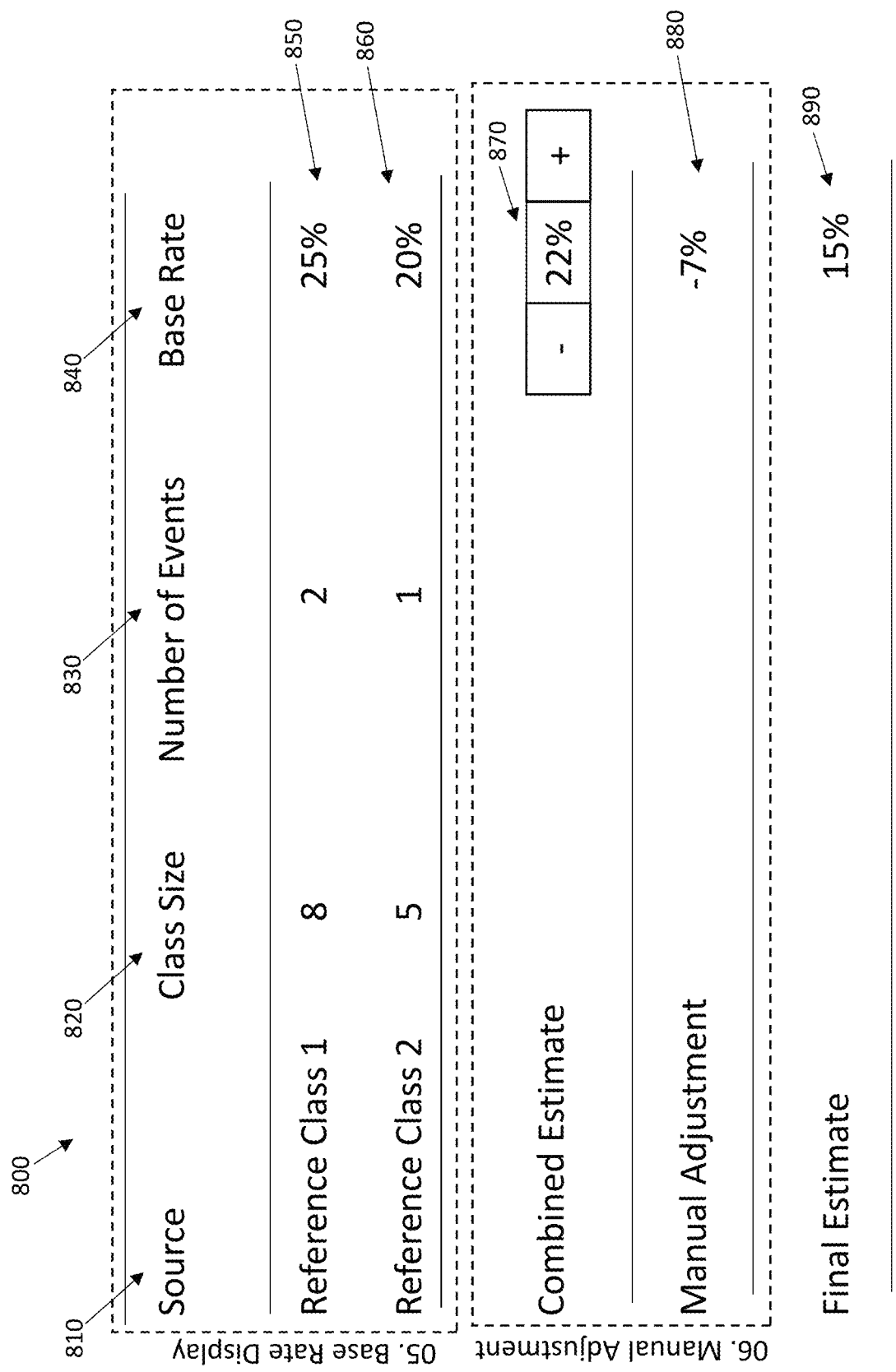
FIG. 8 depicts an example electronic user interface for a user-defined reference class and base-rate display and elicitation of manual adjustments to users' estimates in accordance with embodiments of the present disclosure.

FIG. 8 depicts an example electronic user interface 800 for a user-defined reference class and base-rate display and elicitation of manual adjustments to users' estimates in accordance with embodiments of the present disclosure. As shown in FIG. 8, the user interface 800 can include a sources 810, a class size 820, a number of events 830, and base rate estimates 840 for selected reference classes (e.g., reference classes 1 and 2). A combined estimate 870 of base rate estimates 850 and 860 can be displayed in a data entry field in the user interface 800 to allow a user to make manual adjustments to the combined base rate 870. A difference value 880 based on the manual adjustment of the combined base rate estimate can be displayed in response to the manual adjustment input by the user and can display a final base rate estimate 890 after the manual adjustment.

Figure 9:
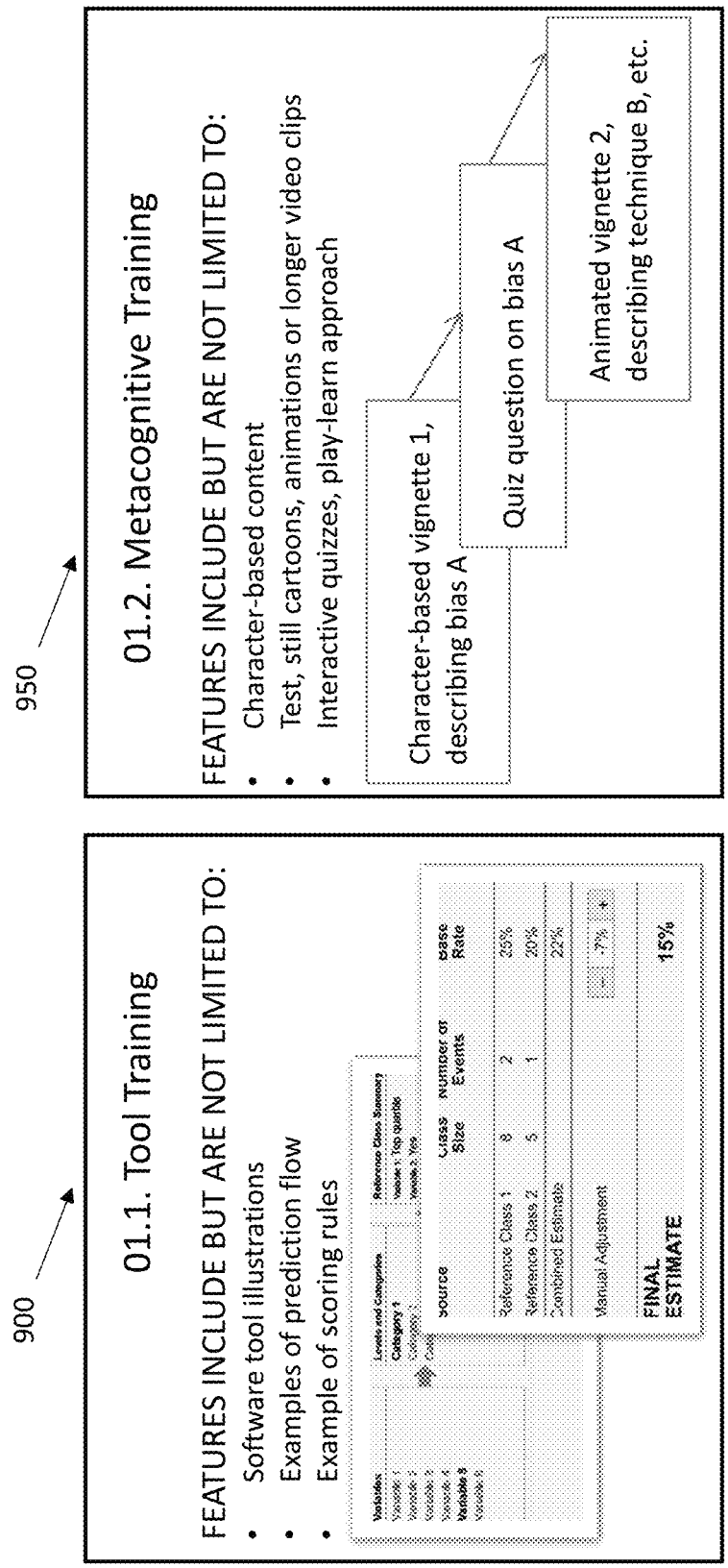
FIGS. 9A-B depicts an exemplary integrated cognitive training module in accordance with embodiments of the present disclosure.

FIGS. 9A-B depicts an exemplary integrated cognitive training module in accordance with embodiments of the present disclosure. As shown in FIG. 9A, the tool training component can train users on how to use embodiments of the system 100. The training can include illustrations 900 of the various graphical user interfaces of the system, examples of prediction flow, and examples of scoring rules. As shown in FIG. 9 B, the metacognitive training component can include but is not limited to metacognitive training 950 based on character-based content, tests, still cartoons, animation or video clips, interactive quizzes, and/or a play-learn approach.

FIG. 10 depicts an exemplary scoring feedback summary 1000 in accordance with embodiments of the present disclosure. As shown in FIG. 10, the summary can be rendered on one of the graphical user interfaces to display user accuracy scores. For example, the summary 1000 can provide a breakdown of the scoring components section 1010 (e.g., a reference class component and a manually adjusted estimate component) for an aggregation of questions associated with the user and can provide a user accuracy score 1020, a benchmark score 1030, and a number of questions 1040. The summary can include an overall score section 1050 that provides an overall user score, an overall benchmark score, and an overall number of questions. The summary can also include an individual question score breakdown section 1060 which can provide a breakdown of the user's scores and benchmark scores on a case-by-case basis.

While the present invention has been described above in terms of specific embodiments, it is to be understood that the invention is not limited to these disclosed embodiments. Many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

The invention claimed is:

1. A method comprising:
receiving a data structure associated with a first database, the data structure being separate from the first database;
configuring a system executed by a processing device based on the data structure to associate a question with the database, generate reference class information, and generate one or more graphical user interfaces specific to the question and the reference class information;
receiving, via the system, selection of at least one of reference class criteria or historical reference cases associated with reference class information independently from a plurality of users via a first graphical user interface of the one or more graphical user interfaces, the reference class criteria being generated in response to configuring the system;
generating, separately and automatically via the system, one or more queries based on the reference class criteria or the historical reference cases to separately define a reference class for each of the plurality of users, the system generating, for each of the plurality of users, at least one of narrower queries and increasing specificity of the reference class as each additional reference class criterion is selected by each of the plurality of users or increasingly broader queries and increasing generalization of the reference class as additional historical cases are selected by each of the plurality of users;
determining the reference class for each of the plurality of users in response to querying the first database using the one or more queries separately generated for each of the plurality of users;
identifying a number of cases in the reference class for each of the plurality of users in response to querying the first database using the one or more queries;
calculating a base rate estimate for each of the plurality of users based on the reference class separately defined by each of the plurality of users, the base rate estimate corresponding to at least one of (a) a frequency of historical event occurrence, (b) time-specific probabilistic estimates derived from survival analysis, or (c) descriptive statistics for a continuous variable associated with the reference class;
prompting each of the plurality of users to manually adjust the base rated estimate for the question, the manual adjustment accounting for deficiencies in the first database with respect to variables for defining the reference class;
generating at least one of an aggregated probabilistic estimate or an aggregated quantitative estimate for the question from the base rate and a final probabilistic estimate generated for each of the plurality of users for the question;
displaying the base rate estimate associated with the reference class or an overall base rate across a plurality of selected different reference classes.

2. The method of claim 1, wherein the reference class criteria is determined separately for each of the plurality of users in response to receiving, via the first graphical user interface, predictive variables and values for the predictive variables from each of the plurality of users or in response to selection of historical reference cases via the first graphical user interface by each of the plurality of users.

3. The method of claim 1, further comprising:
receiving a manual adjustment to the base rate estimate for at least one of the plurality of users;
determining at least one of an adjusted probabilistic estimate or an adjusted quantitative predictive estimate based on the manual adjustment; and
storing the manual adjustment and the adjusted probabilistic or other quantitative predictive estimate for the at least one of the plurality of users in a second database.

4. The method claim 1, wherein the base rate and final probabilistic or other quantitative predictive estimate associated with the plurality of users are aggregated with results from other users into at least one of an aggregated probabilistic estimate or an aggregated quantitative estimate for the question.

5. The method of claim 4, wherein the aggregated probabilistic estimate or other quantitative predictive estimate is updated each time new information is received from any one of the plurality of users or the other users.

6. A method comprising:
determining, for each of a plurality of users, a reference class to which a new case in question belongs in response to receiving inputs associated with reference class information from each of the plurality of users via a first graphical user interface, the inputs including at least one of reference class selection criteria producing a smaller and more specific reference class as each additional reference class criterion is added, or selecting historical reference cases producing a larger and more general reference class as additional historical cases are added;
querying a first database for each of the plurality of users in response to determining the reference class for each of the plurality of users to update a number of cases in the reference class generated for each of the plurality of users;
calculating a base rate estimate, the base rate estimate corresponding to at least one of (a) a frequency of historical event occurrence, (b) time-specific probabilistic estimates derived from survival analysis, or (c) descriptive statistics for a continuous variable associated with the reference class;
generating at least one of an aggregated probabilistic estimate or an aggregated quantitative estimate for the question from the base rate and a final probabilistic estimate generated for each of the plurality of users for the question;
displaying the base rate estimate associated with the reference class or an overall base rate across a plurality of selected different reference classes; and
storing a reference class definition, the base rate estimate and a final predictive estimate for the user in a second database residing on one or more servers.

7. The method of claim 6, wherein the reference class is determined in response to receiving, via the first graphical user interface, predictive variables and values for the predictive variables from the plurality of users characterizing the reference class or in response to selection by the plurality of users of historical reference cases via the first graphical user interface.

8. The method of claim 6, further comprising:
receiving a manual adjustment to the base rate estimate from at least one of the plurality of users;
determining at least one of an adjusted probabilistic estimate or an adjusted quantitative predictive estimate based on the manual adjustment; and
storing the manual adjustment and the adjusted probabilistic or other quantitative predictive estimate for the user in the second database residing on the one or more servers.

9. The method claim 6, wherein the base rate and final probabilistic or other quantitative predictive estimate associated with the plurality of users are aggregated with results from other users into at least one of the aggregated probabilistic estimate or the aggregated quantitative estimate for the question.

10. The method of claim 9, wherein the aggregated probabilistic estimate or other quantitative predictive estimate is updated each time new information is received from any one of the plurality of users or the other users.

11. The method of claim 10, wherein the probabilistic estimates, or other quantitative predictive estimates, are aggregated using a weighted mean or weighted median approach, where a weight value is determined based on the past accuracy of the plurality of users or the other users, properties of defined reference classes, or other characteristics of the plurality of users or the other users.

12. The method of claim 9, wherein the aggregated probabilistic, or other quantitative predictive estimate, estimate is determined using regression-based or machine learning algorithms.

13. The method of claim 1, further comprising:
displaying a visualization with information about historical reference cases included in the reference class selected by each of the plurality of users.

14. The method claim 1, further comprising:
training the plurality of users before the plurality of users provide the predictive estimates, the training including an overview of a prediction process, an introduction to a subject matter area associated with a new question and the first and second databases, or a predictive training section to aid the plurality of users in avoiding cognitive biases and improving forecasting accuracy.

15. The method of claim 1, further comprising:
generating a score for each of the plurality of users based on a performance of each of the plurality of users in providing the probabilistic estimates or other quantitative predictive estimates, the score being determined based on the reference class selections and manual adjustments received from each of the plurality of users.

16. The method of claim 1, further comprising:
administering a series of psychometric tests to measure cognitive abilities and propensities of each of the plurality of users.

17. The method of claim 11, further comprising:
updating at least one of accuracy scores or aggregation schemas as a result of new information about predictive questions, new data on individual user behavior or accuracy, or other new information available in the system.

18. The method of claim 1, further comprising:
generating a report based on information provided by the plurality of users, the report including reference class assessments, final predictive estimates and textual information provided by the plurality of users.

19. The method of claim 10, further comprising:
generating a report for the case, the report including aggregated probabilistic or other quantitative predictive estimates and combined rationales from the user and the other users.

20. The method of claim 1, further comprising:
receiving a preliminary probabilistic or other quantitative predictive estimate from each of the plurality of users before proceeding to determining the reference class each of the plurality of users.

21. The method of claim 1, further comprising:
updating a database with historical reference cases by an administrator through uploading a data table via a graphical user interface, without writing or editing computer code.

22. A system comprising:
a non-transitory computer-readable medium storing instructions; and
a processing device programmed to execute the instructions to:
determine, for each of a plurality of users, a reference class to which a new case in question belongs in response to receiving inputs associated with reference class information from each of the plurality of users via a first graphical user interface, the inputs including at least one of reference class selection criteria producing a smaller and more specific reference class as each additional reference class criterion is added, or selecting historical reference cases producing a larger and more general reference class as additional historical cases are added;
query a first database for each of the plurality of users in response to determining the reference class for each of the plurality of users to update a number of cases in the reference class generated for each of the plurality of users;
calculate a base rate estimate, the base rate estimate corresponding to at least one of (a) a frequency of historical event occurrence, (b) time-specific probabilistic estimates derived from survival analysis, or (c) descriptive statistics for a continuous variable associated with the reference class;
prompt each of the plurality of users to manually adjust the base rate estimate for the question, the manual adjustment accounting for deficiencies in the first database with respect to variables for defining the reference class;
generate at least one of an aggregated probabilistic estimate or an aggregated quantitative estimate for the question from the base rate and a final probabilistic estimate generated for each of the plurality of users for the question;
display the base rate estimate associated with the reference class or an overall base rate across a plurality of selected different reference classes; and
store a reference class definition, the base rate estimate and a final predictive estimate for the user in a second database residing on one or more servers.

23. A non-transitory computer-readable medium comprising instructions that when executed by a processing device causes the processing device to:
determine, for each of a plurality of users, a reference class to which a new case in question belongs in response to receiving inputs associated with reference class information from each of the plurality of users via a first graphical user interface, the inputs including at least one of reference class selection criteria producing a smaller and more specific reference class as each additional reference class criterion is added, or selecting historical reference cases producing a larger and more general reference class as additional historical cases are added;
query a first database for each of the plurality of users in response to determining the reference class to update a number of cases in the reference class generated for each of the plurality of users;
calculate a base rate estimate, the base rate estimate corresponding to at least one of (a) a frequency of historical event occurrence, (b) time-specific probabilistic estimates derived from survival analysis, or (c) descriptive statistics for a continuous variable associated with the reference class;
prompt each of the plurality of users to manually adjust the base rated estimate for the question, the manual adjustment accounting for deficiencies in the first database with respect to variables for defining the reference class;
generate at least one of an aggregated probabilistic estimate or an aggregated quantitative estimate for the question from the base rate and a final probabilistic estimate generated for each of the plurality of users for the question;
display the base rate estimate associated with the reference class or an overall base rate across a plurality selected different reference classes; and
store a reference class definition, the base rate estimate and a final predictive estimate for the user in a second database residing on one or more servers.

* * * * *